United States Patent
Chen et al.

(10) Patent No.: US 10,378,118 B2
(45) Date of Patent: *Aug. 13, 2019

(54) ELECTROFORMED NICKEL-CHROMIUM ALLOY

(71) Applicant: United Technologies Corporation, Farmington, CT (US)

(72) Inventors: Lei Chen, South Windsor, CT (US); Timothy A. Weers, Vernon, CT (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 181 days.

This patent is subject to a terminal disclaimer.

(21) Appl. No.: 15/103,777

(22) PCT Filed: Dec. 3, 2014

(86) PCT No.: PCT/US2014/068447
§ 371 (c)(1),
(2) Date: Jun. 10, 2016

(87) PCT Pub. No.: WO2015/088861
PCT Pub. Date: Jun. 18, 2015

(65) Prior Publication Data
US 2016/0320502 A1 Nov. 3, 2016
US 2019/0072683 A2 Mar. 7, 2019

Related U.S. Application Data

(60) Provisional application No. 61/914,548, filed on Dec. 11, 2013.

(51) Int. Cl.
*C25D 1/00* (2006.01)
*C25D 3/56* (2006.01)
(Continued)

(52) U.S. Cl.
CPC ............... *C25D 1/00* (2013.01); *C25D 3/56* (2013.01); *C25D 3/66* (2013.01); *G01V 1/003* (2013.01);
(Continued)

(58) Field of Classification Search
CPC ....... C25D 3/665; C25D 3/12–18; C25D 3/56; C25D 3/66; C22C 38/18; C22C 38/40; C22C 38/58; F01D 5/28
See application file for complete search history.

(56) References Cited

U.S. PATENT DOCUMENTS 2,763,921 A * 9/1956 Turner, Jr. ............ B32B 15/01
29/DIG. 39
3,338,733 A 8/1967 Rowady
(Continued)

FOREIGN PATENT DOCUMENTS

CA 2854367 A1 5/2013
EP 2623644 A1 8/2013
(Continued)

OTHER PUBLICATIONS

Y.H. You et al. / Surface & Coatings Technology 206 (2012) 3632-3638 (Year: 2012).*
(Continued)

*Primary Examiner* — Louis J Rufo
(74) *Attorney, Agent, or Firm* — Cantor Colburn LLP

(57) ABSTRACT

Various implementations described herein are directed to a method of performing a land seismic survey operation. The method may include receiving a first information from a central recording system by a computer system on a seismic truck. The first information describes time and locations of seismic shots being performed in the seismic survey operation. The method may include using a set of rules and the first information to determine a start time for a seismic shot at a next shot location. The method may also include transmitting a second information that describes the next shot location and the start time to the central recording system.

15 Claims, 3 Drawing Sheets

(51) Int. Cl.
| | |
|---|---|
| C25D 3/66 | (2006.01) |
| F01D 5/28 | (2006.01) |
| C22C 38/18 | (2006.01) |
| C22C 38/40 | (2006.01) |
| C22C 38/58 | (2006.01) |
| G01V 1/00 | (2006.01) |
| G01V 1/26 | (2006.01) |

(52) U.S. Cl.
 CPC ............ *C22C 38/18* (2013.01); *C22C 38/40* (2013.01); *C22C 38/58* (2013.01); *F01D 5/28* (2013.01); *G01V 1/26* (2013.01)

(56) References Cited

U.S. PATENT DOCUMENTS

| | | | |
|---|---|---|---|
| 3,748,110 | A | 7/1973 | Hodshire et al. |
| 3,763,002 | A | 10/1973 | Skomoroski et al. |
| 3,810,782 | A | 5/1974 | Gallmiche |
| 3,917,517 | A | 11/1975 | Jordan et al. |
| 3,998,603 | A | 12/1976 | Rairden, III |
| 4,153,453 | A | 5/1979 | Hart et al. |
| 4,461,680 | A | 7/1984 | Lashmore |
| 5,126,213 | A | 6/1992 | Restall |
| 5,543,183 | A | 8/1996 | Streckert et al. |
| 5,881,972 | A * | 3/1999 | Smith ............... B64C 11/205 244/121 |
| 5,908,285 | A * | 6/1999 | Graff .................. C25D 1/10 205/67 |
| 7,285,337 | B2 | 10/2007 | Narita et al. |
| 2002/0130047 | A1 | 9/2002 | Allen et al. |
| 2004/0054231 | A1 | 3/2004 | Abbott et al. |
| 2008/0017280 | A1 | 1/2008 | Vargas et al. |
| 2010/0252446 | A1* | 10/2010 | Kuzmanovic ......... C25D 3/02 205/684 |
| 2011/0065804 | A1 | 3/2011 | Diddario et al. |
| 2013/0199934 | A1 | 8/2013 | Parkos, Jr. et al. |
| 2016/0002803 | A1* | 1/2016 | Sklar .................. C25D 5/14 428/621 |
| 2016/0312614 | A1 | 10/2016 | Chen et al. |
| 2016/0312627 | A1 | 10/2016 | Chen et al. |

FOREIGN PATENT DOCUMENTS

| | | |
|---|---|---|
| GB | 749909 A | 6/1956 |
| GB | 1233090 A | 5/1971 |

OTHER PUBLICATIONS

Saravanan et al, Int. J. Electrochem. Sci., 6 (2011) 1468-1478 (Year: 2011).*
Liana Anicai, Andreea Florea and Teodor Visan (2011). Studies Regarding the Nickel Electrodeposition from Choline Chloride Based Ionic Liquids, Applications of Ionic Liquids in Science and Technology, Prof. Scott Handy (Ed.), ISBN: 978-953-307-605-8 (Year: 2011).*
Andrew P. Abbott et al: "Ionic Liquid Analogues Formed from Hydrated Metal Salts", Chemistry—A European Journal, vol. 10, No. 15, Aug. 6, 2004 (Aug. 6, 2004), pp. 3769-3774.
European Search Report for European Application No. 14869585.1 dated Jul. 11, 2017, 8 pages.
Gengan Saravanan et al: "Electrodeposition of Fe—Ni—Cr alloy from Deep Eutectic System containing Choline chloride and Ethylene Glycol", Int. J. Electrochem. Sci. International Journal, Jan. 2011 (Jan. 1, 2011), pp. 1468-1478.
International Search Report for Application No. PCT/US14/68447; dated Feb. 11, 2015.
Written Opinion for International Application No. PCT/US14/68447; dated Feb. 11, 2015.
"Inconel alloy 625"; Aug. 13, 2013; Special Metals Corportation, Table 1; 18 pgs.
European Search Report for European Application No. 14869187.6, dated Jul. 11, 2017, 10 pages.
European Search Report for European Application No. 14870576.7, dated Jul. 11, 2017, 10 pages.
International Search Report and Written Opinion for International Application No. PCT/US2014/068580, dated Feb. 11, 2015.
International Written Opinion for international application No. PCT/US14/68445; International filing date: Dec. 3, 2014; dated Oct. 16, 2015; 4 pgs.
Xu et al., "Ni—Cr alloy electrodepositing technology on Fe substrate and coating performance", Journal of Central South University of Technology, vol. 14, No. 2, 2007, pp. 181-185.

* cited by examiner

ELECTROFORMED NICKEL-CHROMIUM ALLOY

CROSS REFERENCE TO RELATED APPLICATION

This application is a National Phase Application of Patent Application PCT/US2014/068447 filed on Dec. 3, 2014, which claims priority to U.S. Provisional Application No. 61/914,548 filed Dec. 11, 2013 and titled Electroformed Nickel-Chromium Alloy, the disclosure each of which are hereby incorporated by reference in their entirety.

FIELD OF USE

The present disclosure relates to an electroformed nickel-chromium (Ni—Cr) alloy suitable for making a turbine component intended to operate in hostile environments. The present disclosure also relates to processes for the production of a thick electroformed Ni—Cr alloy component.

BACKGROUND

High and low pressure turbine components including rotor blades, vanes, and stators are generally made of nickel based alloys to stand hostile environments including high temperature. Electroformed Ni has been used in non-high temperature applications. Nickel has excellent high temperature creep resistance, but poor oxidation resistance. Thus, the addition of chromic or alumina formers to increase the oxidation resistance of the nickel based alloys is desirable, particularly for high temperature environment such gas turbine engines.

Electroforming is a metal forming process that builds up metal components through electrodeposition. The part or component is produced by depositing a metal skin onto a base form, known as a mandrel which is removed after the electrodeposition is done. Electroforming differs from electroplating in that the deposit (e.g., Ni—Cr alloy) is much thicker and can exist as a self-supporting structure when the mandrel is removed.

Electroformed Ni—Cr alloys can provide a cost-effective technique to fabricate high temperature-resistant structures with complex geometries, tighter tolerance, and oxidation resistance. Typically, electrodeposition in the conventional plating chemistry has not been successful in forming Ni—Cr alloys with high chromium content (>8% wt., 20% wt. preferred) that is substantially thicker than 10 µm.

Accordingly, it is desirable is to electroform Ni—Cr alloys thicker than at least 10 µm to make high temperature and oxidation-resistant turbine engine parts having complex geometries and requiring tighter tolerance. Further desirable considerations include the cost effectiveness and environmental impact of the deposition process.

SUMMARY

According to an aspect of the present disclosure, an electroformed nickel-chromium (Ni—Cr) alloy suitable for making turbine engine components is disclosed. The electroformed Ni—Cr alloy comprises from 2 to 50 wt % chromium balanced by nickel, wherein the electroformed Ni—Cr alloy is thicker than 10 µm. The addition of chromium increases the oxidation resistance of the nickel based alloys.

According to an aspect of the present disclosure, an article comprising a Ni—Cr alloy including from 2 to 50 wt % chromium balanced by nickel is disclosed. The article includes a turbine component, and the Ni—Cr alloy is thicker than 125 µm to make a self-supporting turbine component.

According to another aspect of the present disclosure, a method for electroforming a thick nickel-chromium (Ni—Cr) alloy that is suitable for making turbine components is disclosed. The method includes providing a plating bath containing a solvent, a surfactant, and an ionic liquid including choline chloride, nickel chloride, and chromium chloride, wherein a molar ratio of the choline chloride and chromium chloride ranges from 0.5 to 3.5, and the solvent comprises from 5 to 80 vol. % relative to a mixture of the choline chloride and metal chlorides including the nickel and chromium chlorides. The method further includes electroforming the Ni—Cr alloy on a mandrel, i.e. cathode by providing an external supply of current to an anode and the cathode, wherein the mandrel is removed after the Ni—Cr alloy is electroformed. Optionally, the method further comprises applying a protective coating on the Ni—Cr alloy to impart oxidation resistance to the turbine component.

The method further includes electroforming a Ni—Cr alloy on a metallic mandrel cathode while using an anode that is either insoluble or soluble such as nickel under electrolytic conditions. Specifically, the insoluble anode is used to promote the oxidation of water to produce oxygen as the main by-product while other minor products can be produced concurrently as well. The soluble nickel anode is used to replenish the nickel deposited onto the cathode.

The foregoing features and elements may be combined in various combinations without exclusivity, unless expressly indicated otherwise. These features and elements as well as the operation thereof will become more apparent in light of the following description and the accompanying drawings. It should be understood, however, that the following description and drawings are intended to be exemplary in nature and non-limiting.

The details of one or more embodiments of the present disclosure are set forth in the accompanying drawings and the description below. Other features, objects, and advantages of the present disclosure will be apparent from the description and drawings, and from the claims.

Figure 1:
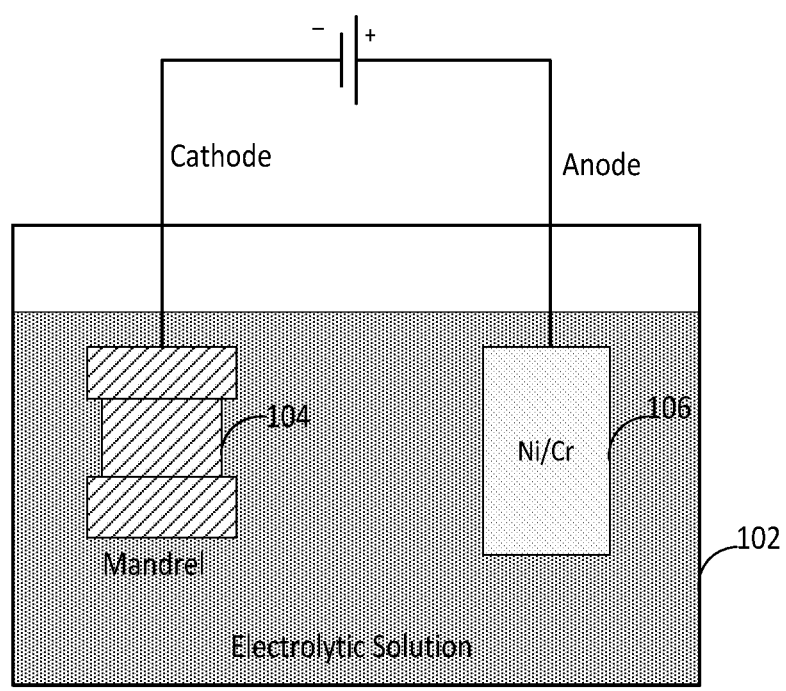
FIG. 1 illustrates a plating bath filled with an electrolytic solution for electroforming a Ni—Cr alloy according to an embodiment of the present disclosure.

The drawing(s) depict various preferred embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Electroforming is a metal forming process that forms self-supporting metal parts or components through electrodeposition. Electroforming a Ni—Cr alloy is a cost-effective and environmentally friendly method to make some high temperature-resistant turbine engine components with complex geometries and tighter tolerance.

According to an aspect of the present disclosure, an electroformed nickel-chromium (Ni—Cr) alloy for use as a turbine component is disclosed. The Ni—Cr alloy comprises from 2 to 50 wt % chromium and the balance nickel, and can be made thicker than at least 10 μm to form self-supporting turbine components. The Figure illustrates a plating bath containing an electrolyte solution for electroforming a Ni—Cr alloy according to an aspect of the present invention. FIG. 1 illustrates a plating bath filled with an electrolytic solution for electroforming a Ni—Cr alloy according to an embodiment of the present disclosure Referring now to FIG. 1, there is provided a plating bath 102 containing an electrolytic solution that consists of a room temperature ionic liquid, namely deep eutectic solvent, including choline chloride, nickel chloride, chromium chloride, solvents, and surfactants like anionic, cationic, or Zwitterionic (amphoteric) surfactants. The surfactant can be one of sodium dodecyl surfate, fluorosurfactants, cetyl trimethylammonium bromide (CTAB), or cetyl trimethylammonium chloride (CTAC). It is noted that the choline chloride based metal processing is low-cost and environmentally friendly. In one embodiment, a molar ratio of the choline chloride and chromium chloride ranges from 0.5 to 3.5. A turbine component is produced by depositing a metal onto a base form, known as a mandrel 104 which is removed after electroforming is done.

In the embodiment, polar aprotic and polar protic solvents are used to adjust the viscosity and conductivity of the plating bath 102 to attain high quality Ni—Cr alloy deposits. Specifically, protic solvents are preferred due to their ability to donate hydrogen bonds. The solvents include formic acid, citric acid, Isopropanol (IPA), water, acetic acid, and ethylene glycol.

According to one embodiment, preferred solvent content is from 10 to 80 vol % relative to the mixture of choline chloride and metal chlorides including the nickel and chromium chlorides on a pre-mixing basis. Referring to FIG. 1, electroforming the Ni—Cr alloy begins by providing an external supply of current to an anode and a cathode. The mandrel is the cathode. The current can be a direct current (DC) or an alternating current (AC) including a pulse or pulse reverse current (not shown). The regime and/or magnitude of the current can be controlled during the deposition to achieve desired coating composition, density, and morphology.

When the current is supplied, the metal at the soluble anode is oxidized from the zero valence state to form cations with a positive charge. Metal cations, generally in complex forms in the presence of anions in the solution, are reduced at the cathode to deposit in the metallic, zero valence state. The result is the effective reduction and transfer of Ni and Cr ionic species from the electrolytic solution to the mandrel 104. The mandrel 104 is removed after the electroforming is done.

The turbine component to be made is electroformed on the mandrel 104 which is a cathode during electrodeposition. The anode is made of the metal to be plated on the mandrel, and includes a Ni—Cr alloy anode, a Ni and/or Cr anode, or any combination of these materials can be chosen to satisfy different requirements. An insoluble catalytic anode (catalyzing oxygen evolution, hexavalent chromium formation) is preferable, but the anode used is not specifically limited. A combination of soluble Ni anode and an insoluble catalytic anode can be used to control bath composition during the course of electrodeposition as well.

The mandrel is pre-treated prior to electrodeposition. The pre-treatment includes degreasing, cleaning the surface, and activation before being placed in the plating bath for electrodeposition. To enhance mass transport, the mandrel 104 can be moved in either a rotating or reciprocating mode or the electrolytic solution can be agitated during the electroforming process. The electroforming process inevitably decomposes water in the bath 102, and thus the solution in the bath is replenished to maintain consistent deposition quality.

Figure 2:
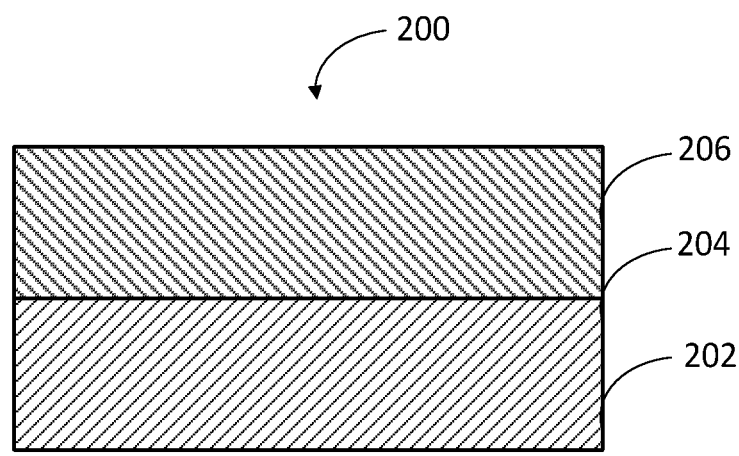
FIG. 2 illustrates an article comprising an electroformed Ni—Cr alloy according an embodiment of the present disclosure.

FIG. 2 illustrates an article comprising an electroformed Ni—Cr alloy according an embodiment of the present disclosure. Feasibility of thick electroformed Ni—Cr alloys has been demonstrated by electroforming a Ni—Cr alloy which is thicker than 125 μm to make turbine components. In one embodiment, an article 200 comprises an electroformed Ni—Cr alloy 202 that includes from 2 to 50 wt % chromium balanced by nickel, and is thicker than at least 10 μm which was not attainable through the conventional methods.

In another embodiment, although not specifically limited, an electroformed Ni—Cr alloy 202 comprises from 8 to 20 wt % chromium balanced by nickel. In the embodiment, the Ni—Cr alloy is thicker than 125 μm to make a self-supporting turbine component. Optionally, a protective coating 206 can be applied on a surface 204 of the Ni—Cr alloy 202 to impart further oxidation resistance to the article 200. The protective coating 206 may include aluminum and a bond coat and other thermal barrier coatings. Heat treatment may be performance on the structure.

Figure 3:
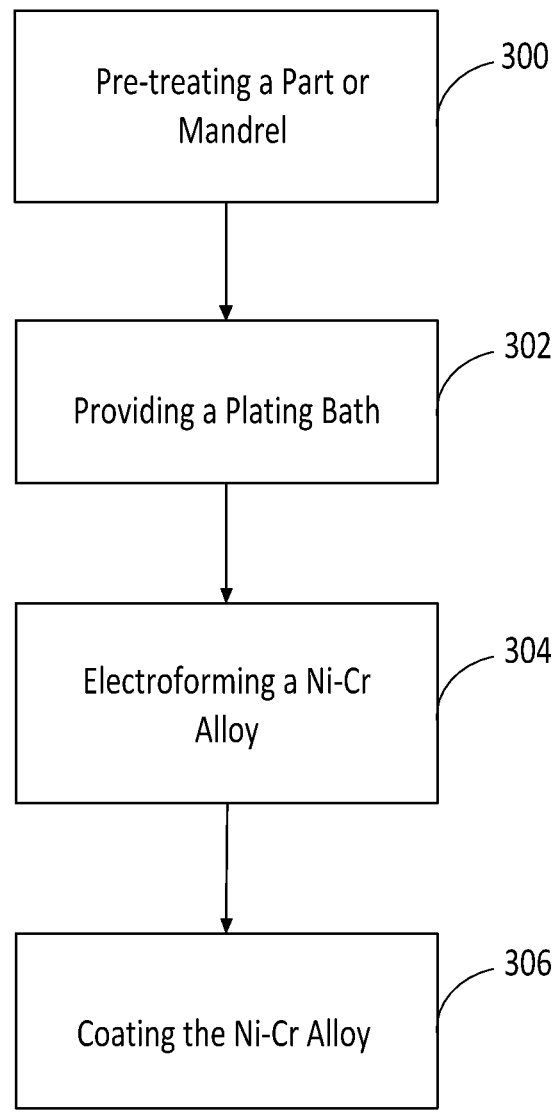
FIG. 3 is a flow chart of an electroforming Ni—Cr alloy process of the present disclosure.

FIG. 3 is a flow chart of an electroformed Ni—Cr process of the present disclosure. Referring now to FIG. 3, forming a thick electroformed Ni—Cr alloy to make turbine parts begins at step 300 where a part to be made or a mandrel is pre-treated prior to electroforming a Ni—Cr alloy to remove foreign materials on the surface of the part of mandrel. At step 302, a plating bath filled with a solution including a solvent, a surfactant, and an ionic liquid is provided. At step 304, the Ni—Cr alloy is electroformed on the part or mandrel by providing an external supply of current to an anode and a cathode. The mandrel can be moved in a rotating or reciprocating mode during the electroforming process to increase the deposition rate. The electroforming step 304 is done when the Ni—Cr alloy reaches the desired thickness.

After the electroforming is done at step 304, optionally, a protective coating 206 may be applied at step 306. In one embodiment, the protective coating 206 may include a bond coat or a thermal barrier coating. The protective coating 206 may be applied to a surface 204 of the electroformed Ni—Cr alloy 202 at step 306 to impart oxidation resistance to the Ni—Cr alloy 202. The disclosed choline chloride based electroforming is a metal forming process that is cost-effective to make high temperature-resistant turbine parts with complex geometries and tighter tolerance, and is environmentally friendly.

It is to be understood that the disclosure of the present invention is not limited to the illustrations described and shown herein, which are deemed to be merely illustrative of the best modes of carrying out the disclosure, and which are susceptible to modification of form, size, arrangement of parts, and details of operation. The disclosure is intended to encompass all such modifications which are within its spirit and scope of the invention as defined by the following claims.

What is claimed is:

1. A method for electroforming a nickel-chromium (Ni—Cr) alloy, comprising:
   providing a plating bath containing a solvent, a surfactant, and an ionic liquid including choline chloride, nickel chloride, and chromium chloride, wherein a molar ratio of the choline chloride and chromium chloride ranges from 0.5 to 3.5 and the solvent comprises from 5 to 80 vol. % relative to a mixture of the choline chloride and metal chlorides including both nickel chloride and chromium chlorides; and
   electroforming the Ni—Cr alloy onto the mandrel by providing an external supply of current to an anode and a cathode, wherein the mandrel is removed after the Ni—Cr alloy is electroformed.

2. The method according to claim 1, wherein the anode is an insoluble anode.

3. The method according to claim 1, wherein the anode is a Ni—Cr alloy anode, a Ni anode, or a Cr anode.

4. The method according of claim 1 further comprising pre-treating the mandrel prior to electroforming the Ni—Cr alloy.

5. The method according to claim 1, wherein a protective coating is applied on the electroformed Ni—Cr alloy.

6. The method according to claim 1, wherein the current is a direct current or an alternating current.

7. The method according to claim 1, wherein the solvent is a polar protic solvent.

8. The method according of claim 1, wherein the solvent is a polar aprotic solvent.

9. The method according of claim 1, wherein the solvent is chosen from one or more of formic acid, citric acid, isopropanol (IPA), water, acetic acid, and ethylene glycol.

10. The method according to claim 1, wherein the surfactant is an anionic, a cationic, or an amphoteric surfactant.

11. The method according to claim 1, wherein the surfactant is either sodium dodecyl surfate, fluorosurfactants, cetyl trimethylammonium bromide (CTAB), or cetyl trimethylammonium chloride (CTAC).

12. The method according to claim 1, wherein the electroformed Ni—Cr alloy comprises from 2 to 50 wt % chromium balanced by nickel.

13. The method according to claim 1, wherein the electroformed Ni—Cr alloy comprises from 8 to 20 wt % chromium balanced by nickel.

14. The method according to claim 1, wherein the electroformed Ni—Cr alloy is thicker than 125 µm.

15. A method for electroforming a nickel-chromium (Ni—Cr) alloy, comprising:
   providing a plating bath containing a solvent, a surfactant, and an ionic liquid including choline chloride, nickel chloride, and chromium chloride, wherein a molar ratio of the choline chloride and chromium chloride ranges from 0.5 to 3.5 and the solvent comprises from 5 to 80 vol. % relative to a mixture of the choline chloride and metal chlorides including both nickel chloride and chromium chlorides; and
   electroforming the Ni—Cr alloy onto the mandrel by providing an external supply of current to an anode and a cathode, wherein the mandrel is removed after the Ni—Cr alloy is electroformed, wherein the electroformed Ni—Cr alloy comprises from 2 to 50 wt % chromium balanced by nickel, and
   wherein the electroformed Ni—Cr alloy is thicker than 125 µm.

* * * * *